(No Model.)

W. M. CARNER & J. G. ROZELLE.
HYDROCARBON BURNER.

No. 497,565. Patented May 16, 1893.

WITNESSES
Carroll J. Webster.
Floyd R. Webster

INVENTORS
William M. Carner
John G. Rozelle
By William Webster Atty.

UNITED STATES PATENT OFFICE.

WILLIAM M. CARNER AND JOHN G. ROZELLE, OF BOWLING GREEN, OHIO.

HYDROCARBON-BURNER.

SPECIFICATION forming part of Letters Patent No. 497,565, dated May 16, 1893.

Application filed October 27, 1892. Serial No. 450,106. (No model.)

*To all whom it may concern:*

Be it known that we, WILLIAM M. CARNER and JOHN G. ROZELLE, of Bowling Green, county of Wood, and State of Ohio, have invented certain new and useful Improvements in Hydrocarbon-Burners; and we do hereby declare that the following is a full, clear, and exact description of the invention, which will enable others skilled in the art to which it appertains to make and use the same, reference being had to the accompanying drawings, and to the figures of reference marked thereon, which form part of this specification.

Our invention relates to hydro-carbon burners, and has for its object to construct a burner that shall be simple in construction, convenient of adjustment, within the combustion chamber, and economical in the consumption of fuel.

A further object is to construct a burner with a retort, with means for preventing back pressure of the generated vapor, a burner pipe arranged relatively to the retort, and a pipe connecting the retort and burner, having an air mixer intermediate its length, and sufficiently distant from the burner to extend without the combustion chamber to receive air to support combustion at a normal temperature.

The invention consists in the parts and combination of parts hereinafter described and pointed out in the claim.

Figure 1:
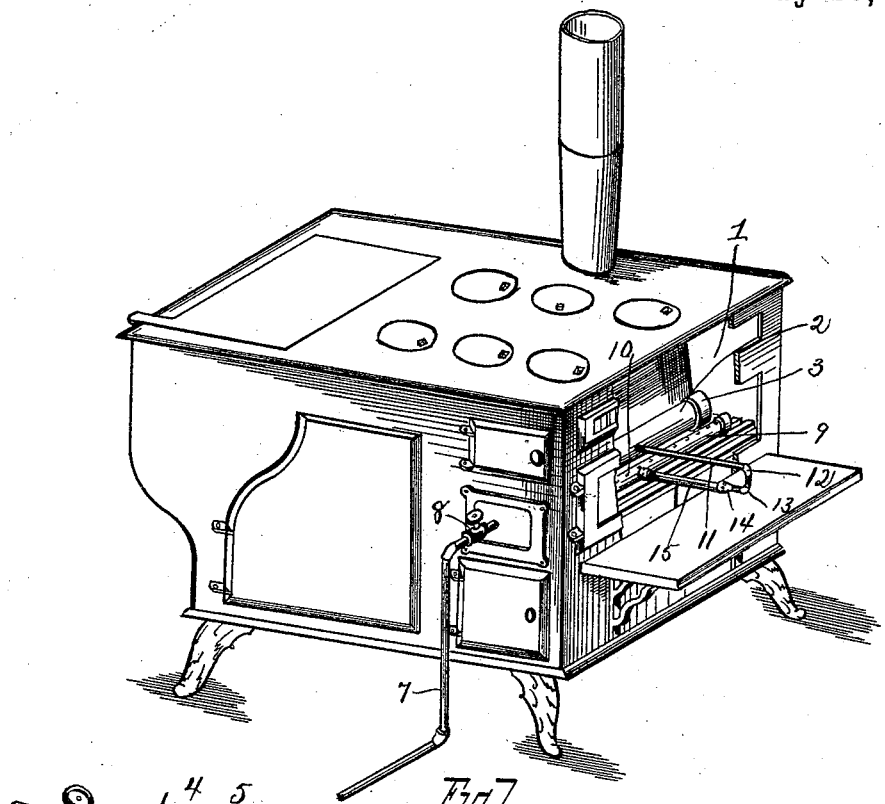
Figure 2:
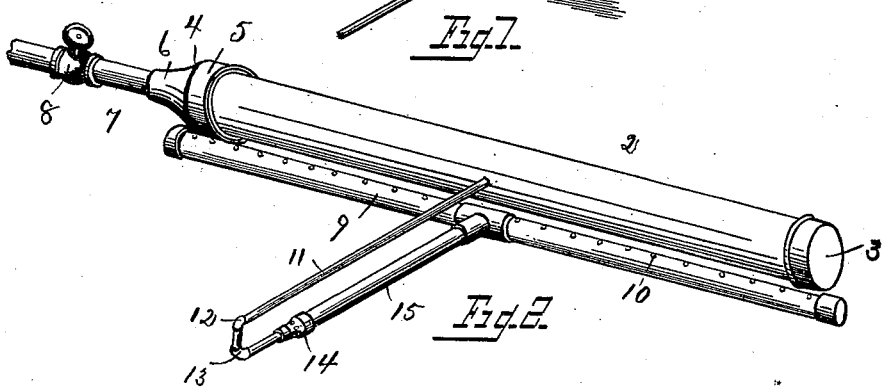
Figure 3:
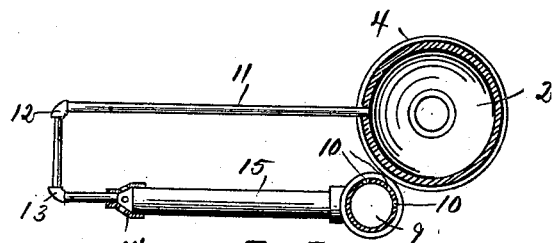

In the drawings: Figure 1 is a perspective view of a stove, showing the burner arranged within the combustion chamber, with a portion of the pipe, and the mixer outside the same. Fig. 2 is a perspective view of the burner. Fig. 3 is a transverse section of burner shown in Fig. 1.

1 designates the combustion chamber of an ordinary stove, in which is shown the burner in position. While our burner is adapted for use in furnaces, &c., the feature of the pipe and mixer is better illustrated in connection with a cooking stove, a use to which the burner is especially adaptable.

2 designates a vaporizer comprising a tubular shell closed at one end by a cap 3, the opposite end having a cap 4 of two diameters, the large portion 5 being of a diameter to screw onto the end, and the smaller diameter 6 formed by a tapering shell to admit the oil supply pipe 7, which is screwed therein and provided with a cock 8, to cut off or regulate the supply of oil to the vaporizer.

9 designates the burner pipe, arranged parallel with the vaporizer and below the same, slightly in front, the pipe being formed with preferably three rows of perforations 10, so disposed that the products of combustion shall impinge upon the vaporizer, at three points, and thereby envelope the same.

11 designates a pipe tapped into the vaporizer centrally of its length, and projecting forwardly from the front of the pipe, a distance to extend outside the front of the stove, where it is turned at a right angle, as at 12, and again at a right angle as at 13, parallel with pipe 11 where it enters a mixer 14, connected with an enlarged pipe 15, which enters the burner immediately below pipe 11.

In operation to start an initial fire oil is permitted to flow into the vaporizer and through pipes 11 and 15 into burner 9, when it flows through the perforations into a suitable pan, (not shown,) or it may be ignited as it issues from the perforations, the flame enveloping the vaporizer soon converting the oil therein into gas, which then passes to the burner. Oil is now admitted to the vaporizer in just sufficient quantity to supply the necessary gaseous vapor to the burner to maintain the proper combustion. As the gaseous vapor passes into the mixer, it draws in a large quantity of air, which becomes heated and intimately commingles with the same before passing to the burner. The conically formed reduced end of cap 4 acts as a cushion to the vapor, and tends to prevent its back pressure into the oil delivery pipe, and consequently avoids fluctuation. We have found by actual test that in causing gaseous vapor to travel some distance from the vaporizer to the burner and uniting air therewith at its normal temperature, the gaseous fuel is fed more evenly to the burner than when led directly from the vaporizer to the burner, and hence there is less liability of fluctuation of feed of fuel.

What we claim is—

In a hydrocarbon burner, a vaporizer formed with a closed end, a cap upon the opposite end having a conically reduced end, a burner pipe below the vaporizer formed with a plurality of rows of perforations a pipe connected with the vaporizer and extending forwardly therefrom to a point outside the combustion chamber, a mixer upon the pipe, and a pipe connected with the mixer and burner.

In testimony that we claim the foregoing as our own we hereby affix our signatures in presence of two witnesses.

WILLIAM M. CARNER.
JOHN G. ROZELLE.

Witnesses:
WILLIAM WEBSTER,
CARROLL J. WEBSTER.